United States Patent [19]
Jehanno

[11] Patent Number: 5,359,519
[45] Date of Patent: Oct. 25, 1994

[54] PROCESS AND DEVICE FOR MEASURING THE TORQUE OF AN INTERNAL COMBUSTION HEAT ENGINE TAKING INTO CONSIDERATION, IN PARTICULAR, THE RECIRCULATION OF EXHAUST GASES AND RESIDUAL BURNT GASES AND EXCESS OXIDANT

[75] Inventor: Gilles Jehanno, Aubergenville, France

[73] Assignee: Regie Nationale des Usines Renault, Boulogne-Billancouret Cedex, France

[21] Appl. No.: 942,614

[22] Filed: Sep. 10, 1992

[30] Foreign Application Priority Data

Sep. 12, 1991 [FR] France ............... 91 11274

[51] Int. Cl.$^5$ ............................................. F02B 3/02
[52] U.S. Cl. ........................... 364/431.05; 364/431.08; 123/419; 123/436; 123/305; 123/425; 73/115
[58] Field of Search .............. 364/431.01, 431.02, 364/431.03, 431.04, 431.05, 431.06, 431.07, 431.08, 424.1, 424.01; 74/866, 867, 860; 123/305, 419, 436, 425, 479; 73/115

[56] References Cited

U.S. PATENT DOCUMENTS

| | | | |
|---|---|---|---|
| 4,197,767 | 4/1980 | Leung | 74/860 |
| 4,357,662 | 11/1982 | Schira et al. | 364/431.08 |
| 4,538,567 | 9/1985 | Grow | 123/305 |
| 4,545,346 | 10/1985 | Grow | 123/305 |
| 4,754,606 | 7/1988 | Nam | 60/616 |
| 4,936,277 | 6/1990 | Deutsch et al. | 123/436 |
| 4,987,770 | 1/1991 | Nanyoshi et al. | 73/115 |

FOREIGN PATENT DOCUMENTS

| | | |
|---|---|---|
| 0164873 | 5/1985 | European Pat. Off. . |
| 0437057 | 7/1991 | European Pat. Off. . |
| 2301693 | 2/1976 | France . |
| 9007051 | 6/1990 | PCT Int'l Appl. . |

Primary Examiner—Thomas G. Black
Assistant Examiner—Jacques Harold Louis-Jacques
Attorney, Agent, or Firm—Oblon, Spivak, McClelland, Maier & Neustadt

[57] ABSTRACT

In internal combustion engines in which residual burnt gases (GBR) exist and in which a recirculation of exhaust gases (RGE) is provided as well as the engines in which the gas mixture is low in gasoline or in the case of diesel engines, a digital value Cg, representative of the average gas torque per combustion and provided by a system, not shown, is corrected as a function of total rate q of recirculation of the exhaust gases and the presence of the residual burnt gases. The correcting device comprising calculating means (56) for producing a correction factor $Q_2 = (1 - p_2 \cdot q)$, in which $p_2$ is a constant close to 0.50 and q, the value of said total rate, then applying this factor $Q_2$ to value Cg, if necessary previously corrected as a function of richness r of the gas mixture when $r<1$, for providing a corrected digital value $(Cg)_q$ or $(Cg)_{r,q}$. Other devices are provided for correcting Cg in the case of excess oxidant and in the case of diesel engines.

8 Claims, 2 Drawing Sheets

PROCESS AND DEVICE FOR MEASURING THE TORQUE OF AN INTERNAL COMBUSTION HEAT ENGINE TAKING INTO CONSIDERATION, IN PARTICULAR, THE RECIRCULATION OF EXHAUST GASES AND RESIDUAL BURNT GASES AND EXCESS OXIDANT

BACKGROUND OF THE INVENTION

1. Field of the Invention

The invention relates to a process and a device for measuring the value of the average gas torque by combustion of an internal combustion heat engine, and, more specifically, to processes and devices for correcting the value of this average gas torque by combustion as a function of certain operating parameters such as the rate of recirculation of the exhaust gases, the rate of residual burnt gases and excess oxidant (air).

2. Description of the Related Art

In an internal combustion heat engine, the torque produced is the resultant of many parameters and reflects the adequacy of their settings. It constitutes the output of a complex dynamic system. Its measurement is relatively simple and usual on a test-bed, but the cost of this measurement is relatively high. Further, the usual measuring beds deliver only the average values on several combustion cycles of the torque of the engine in stabilized operation. Such measurements of average values over a large number of combustion are insufficient in many respects, for example, for optimizing certain settings of the engine or for diagnosing certain operating defects. Of these defects, detection and statistical evaluation of combustion misfiring are necessitated by new international regulations.

To achieve the above objectives, the quantitative analysis of the average gas torque by combustion produced by the combustion of the gas mixture in the various cylinders of the heat engines is necessary. Such an analysis so far has been made only in the laboratory or on very high-power engines, and it generally relies on increases of pressure in the combustion chambers. This technique exhibits the major drawback of being able to be used only on engines designed (or specially modified) to make possible an installation of pressure sensors. In addition, it obviously is not immediately applicable to engines routinely mounted on a vehicle and, further, it remains so, as long as the reliability, the cost, the life and the convenience of use of the pressure sensors are not in accordance with the economic requirements of the automobile industry.

In a PCT international patent application, filed by Motorola Inc. and published on Jun. 20, 1990 under No. WO 90/07051, an electronic control system of the operation of an internal combustion heat engine is described. This system is based on the concept that the instantaneous value of the advancement period of the teeth of a measuring ring gear, integral with the inertial flywheel of the engine, and in front of a stationary sensor, corresponds to the measurement of the instantaneous power output successively produced in each of the cylinders of the engine. The signal thus produced by the sensor is accordingly processed. This processing consists in: (1) measuring the instantaneous period $d_i$ of advancement for the teeth of the ring gear in front of the sensor, (2) respectively multiplying periods $d_i$ of the teeth relating to each of the cylinders by given weighing factors $P_i$ belonging to a sequence corresponding to a particular operating criterion of the engine such as pinging or power output (the procedure for determining these factors is not described), (3) adding results $d_i.P_i$ obtained for each cylinder, (4) comparing this sum to a particular value taken as reference, (5) deducing, if necessary, from the result of this comparison the presence of pinging in a cylinder or a power imbalance of a cylinder relative to the others and (6) consequently modifying the supply to the cylinder of an air-fuel mixture.

The object of the system thus described is to eliminate all pinging in the cylinders of the engine and/or to balance the instantaneous power outputs provided by each of them. As a result, the absolute value of the various intermediate magnitudes obtained is neither desired nor found.

In the copending patent application filed by Applicants on the same date as the present application and titled: "PROCESS AND DEVICE FOR MEASURING THE TORQUE OF AN INTERNAL COMBUSTION HEAT ENGINE," which is hereby incorporated by reference, a device is described for producing a value Cg, representative of the average gas torque produced by each combustion of the gas mixture in the cylinder or cylinders of an internal combustion heat engine. This device comprises measuring reference points placed on a ring gear integral with the inertial flywheel of the engine or integral with the crankshaft, means for defining an indexing reference per flywheel revolution or per camshaft revolution for the reference points, an advancement sensor of the reference points mounted stationary in the vicinity of the ring gear, means for producing a primary value $d_i$ representative of the period of advancement of each of the reference points in front of the sensor, means for processing this primary value $d_i$ and thus producing two secondary values, respectively representative of average angular velocity $\Omega_m$ of the reference points during a period of the combustion in the engine and, for the same period of the combustion, representative of the $E\cos\phi$ projection on the phase reference line, groups of reference points respectively relating to the combustion in the various cylinders of the engine, of alternating component E of instantaneous angular velocity $\Omega_i$ of the reference points at the frequency of the combustion in the engine, and means for combining these two secondary values, according to an equation:

$$Cg = -a.\Omega_m E\cos\phi + b.\Omega^2_m$$

and thus producing the desired value, terms a and b being constants determined experimentally.

In the particular case of a four-cycle, four-cylinder gasoline engine which operates according to the four-stroke cycle, each of the four periods of the cycle (intake, compression, combustion-expansion, exhaust) occurs during a particular half-revolution of the inertial flywheel integral with the crankshaft of the engine. The kinetic energy acquired by the system concerned (crankshaft, flywheel and alternating weights) is the result of various positive and negative instantaneous torques exerted on it during each of the different periods of the operation cycle of the engine.

Torque Cg, calculated for each half-revolution in the special case above, is produced during the compression and combustion expansion phases of the gas mixtures respectively trapped in two contiguous combustion cylinders. Since the engine is equipped with four cylinders in the case being considered, the two other cylinders are in intake and exhaust phases and it is possible to demonstrate as a first approximation that they do not affect the value of Cg because of the $\cos\phi$ projection. Since the compression phases are less subject to variations, i.e., to dispersions, than the combustion-expansion phases, it is possible to conclude that the value of Cg calculated on a half-revolution is that relative to the cylinder which was firing. It is also possible to conclude that torque Cg is an estimation of the average gas torque in the two phases, compression and combustion-expansion, of the same cylinder therefore trapping the same gas mixture.

Regardless of the engine, Cg is, on the one hand, normally positive and, on the other hand, balanced by the sum of resistant average torques coming from variations of the rotary inertias of the engine, of various internal frictions in the engine, of intake vacuums and of exhaust excess pressures of the other cylinders and, of course, of the load, i.e., the vehicle.

The theorem of the kinetic energy teaches that the elementary variation of the kinetic energy of a system equals the elementary work of the torques to which they are subjected. By applying this theorem to the system concerned, namely the crankshaft, the inertial flywheel and the alternating weights involved, and by assuming that the crankshaft-flywheel unit is rigid, using a harmonic analysis of the result obtained, the load placed downstream from the inertial flywheel being considered as totally uncoupled for the frequency being considered, it is demonstrated that the alternating component Ca of the gas torque at the frequency of the combustion in the engine is linked to average angular velocity $\Omega_m$ of the inertial flywheel and to the projection, on a phase reference line, of alternating component E of instantaneous angular velocity $\Omega_i$ of this flywheel, at the frequency of the combustion of the engine, by the following linear equation:

$$Ca = -a_1.\Omega_m.E\cos\phi b_1.\Omega^2_m$$

in which $a_1$ and $b_1$ are two constant terms, the first proportional to the rotary inertia of the engine and the second, a function of the moment of inertia of the alternating masses and, in some cases of measurement, irregularities of position of the reference points of the measuring ring gear.

Further, an experimental study on the test-bed of several internal combustion heat engines has shown that the Cg/Ca ratio of average value Cg of the gas torque and of alternating component Ca of the same gas torque varies little for the various speeds and for the various operating loads of the engine concerned, especially since richness (r) of the gas mixture is constant or greater than or equal to one.

Consequently, the experimentation and the calculation for a rigid crankshaft-flywheel system have made it possible to produce the equation $$Cg = -a.\Omega_m.E\cos\phi + b.\Omega^2_m$$

which is at the origin of the process and the measuring device for the low speeds of the engine as described and claimed in the above-mentioned patent application.

In the case of high operating speeds of the engine, this basic equation must, however, undergo a correction. Actually, at high speed, the torsional elasticity of the engine linkages, particularly that comprised by he crankshaft and the inertial flywheel of the engine, exhibit a frequency transfer function which modifies vector E which is representative of the basic alternating component of the instantaneous angular velocity of the flywheel at frequency fi of the combustion in the engine. Since the links have insignificant damping, the transfer function can be written $Z=1+(fi/fr)^2$, term fi being the combustion frequency proportional to rotation frequency fv of the flywheel (fi=fv.2k/t) with k the number of cylinders and t the number of periods of the operating cycle of the engine and fr the frequency of mechanical resonance in torsion of the crankshaft/flywheel connection. In practice, this frequency fr is equal to four to six times the maximum rotation frequency in Hertz of the engine, so that term $z=(fi/fr)^2$ relative to combustion frequency fi will often be low and so that a simple correction factor $(1-z)$ can be applied to constant "a" of the basic equation referred to above, so that calculated value Cg is corrected for the "crankshaft/flywheel torsion" effect.

In the above-mentioned copending patent application, the influence on the calculation of Cg of the recirculation of exhaust gases (RGE), of the presence of residual burnt gases (GBR) and of excess oxidant (air) in the cylinders have not been taken into account.

SUMMARY OF THE INVENTION

It is therefore an object of this invention to round out the process and the device of the above-mentioned copending patent application for calculating value Cg of the average gas torque by combustion by taking into consideration the rate of recirculation of exhaust gases (RGE) and the rate of residual burnt gases (GBR).

The invention therefore relates, in a system for producing a value Cg representative of the average gas torque per combustion, a device for correcting value Cg as a function of total rate (q) of recirculation of the exhaust gases and of the residual burnt gases in the cylinders of the engine, including calculating means for producing a correction factor $Q_2=(1-p2.q)$, in which $p_2$ is a constant close to 0.5 to be determined experimentally and q, the value of said total rate, then applying this factor $Q_2$ to value Cg, if necessary previously corrected as a function of richness r of the 15 gas mixture for providing a corrected measuring value $(Cg)_r$ or $(Cg)_{r,q}$.

The invention also relates to a device for correcting value Cg in case of excess oxidant in the cylinders, including first calculating means for producing an intermediate value $Ca=Cg/u$, with u being a stored constant which is less than one and is determined experimentally, and second calculating means for producing desired value $(Cg)_p = Ca - k_r.R$, with $k_R$ being a stored constant which is determined experimentally and R being the filling of the cylinders, which is determined experimentally as a function of magnitudes already calculated or measured, and forming a stored mapping.

The invention relates, in a similar manner, to a process for correcting value Cg as a function of the rate of recirculation of exhaust gases and of the rate of residual burnt gases as well as a process for correcting value Cg in case of excess oxidant in the cylinders.

BRIEF DESCRIPTION OF THE DRAWINGS

The characteristics and advantages of the invention will come out more precisely from the description of a particular embodiment of the invention, given below by way of nonlimiting example, with reference to the accompanying drawings in which.

DETAILED DESCRIPTION OF PREFERRED EMBODIMENTS

Figure 1:
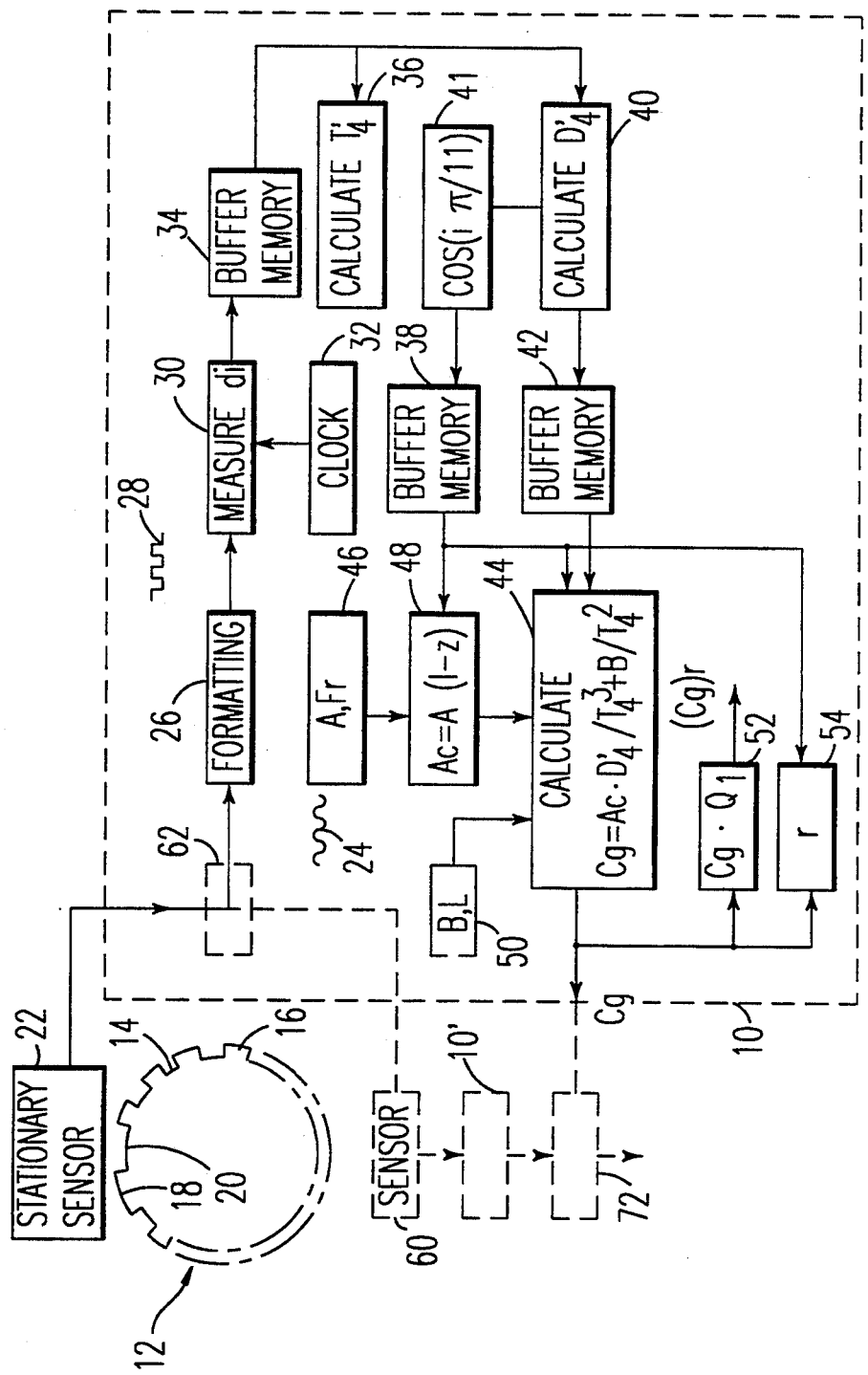
FIG. 1 is a diagram of the various constituent elements of the device for measuring the average gas torque per combustion according to the above-mentioned copending U.S. patent application.

To make possible the comprehension of this invention, it is necessary to describe, in relation to FIG. 1, the device or system for calculating value Cg representative of the average gas torque per combustion corresponding to the above-mentioned copending U.S. patent application.

In this FIG. 1 is represented circuit 10 for measuring average gas torque Cg, produced by each combustion of the gas mixture in a heat engine with four cycles (t=4) and four cylinders (k=4), equipped with a measuring ring gear 12, integral with the inertial flywheel, for example a ring gear of standard type mounted on electronic ignition engines.

By way of example, ring gear 12 comprises on its periphery thirty-eight identical teeth (a tooth being defined as transition between a projection and a recess), such as those referenced 14 and 16, which are distributed in two series of nineteen teeth separated by two sets of reference teeth, such as those referenced 18 and 20, which reference teeth are diametrically opposite and which have a width triple that of the other teeth. In fact, the ring gear comprises:

n=2×19+2×3=44 equidistant reference points called real or virtual teeth of the same module, of which two are diametrically opposite to serve as reference or as indexing origin, making it possible to number the teeth and, in particular, to determine tooth $d_o$ which will be defined below.

A stationary sensor 22, for example with variable reluctance, suitable for delivering an alternating signal 24 of frequency proportional to the advancing speed of the teeth of the ring gear, i.e., proportional to the instantaneous speed of the flywheel, is associated with ring gear 12.

The angular position of this sensor 22 relative to indexing teeth 18 when the piston is at top dead center is known or determined, which makes it possible to determine tooth $d_o$ as being that which advances in front of the sensor during the passage of the piston of the cylinder concerned to its top dead center of combustion.

The signal, delivered by sensor 22, is applied at the input of a formatting circuit 26, suitable for delivering substantially square wave signals 28 of a period equal to instantaneous period $d_i$ of incident signals 24, index i varying from 0 to 21 as the teeth advance in front of the sensor. Each period $d_i$ of the signal thus produced corresponds to the transition of one tooth, i.e. of a solid part and a recess part, in front of sensor 22. With regard to the incident signals produced by indexing teeth 18, formatting circuit 26 transforms them in the same way into a steep-side signal, of a period approximately triple that of the signals relating to the other teeth (14, 16). Signals 28 are applied at a stage 30 for measuring and for calculating instantaneous periods $d_i$ of advancement of the real and virtual teeth of measuring ring gear 12 in front of sensor 22.

For this purpose, by way of embodiment of stage 30, a counter continuously receives chronometric pulses of high frequency (1 to 20 MHz, for example), produced by a quartz clock 22, for example, and it delivers as output digital values, representative of the numbers of clock pulses counted, therefore of the "date" (overflow module of the counter) of each hollow-solid transition of the steep-front signals, produced by formatting stage 26. This counter alternately transmits the "date" $t_{i-1}$ that it contains to a first register and a following date $t_i$ to a second register. These two registers are followed by a calculating stage suitable for calculating period $d_i = (t_i - t_{i-1})$ of index tooth i and to address its result to a buffer memory 34. In this way, no clock pulse is lost and the measuring error of periods $d_i$ is minimized.

With regard to the processing of each signal 28 produced by one of long indexing teeth 18, 20 within the framework of the example described, its value will be divided by three and the result, assigned to three corresponding virtual teeth while, if necessary, taking into account the remainder. In this way, stage 30 for measuring and calculating periods $d_i$ addresses to buffer memory 34 successive series of $n_c = n/2$ (or 22 in the case of the example described) digital values $d_i$, respectively associated with n/2 weighing coefficients contained in a permanent memory 41 and defined by row i of the real or virtual tooth concerned.

In the case of the four-cycle and four-cylinder engine of the example, with each half-revolution of the flywheel, the digital values contained in buffer memory 34 are updated. Values $d_i$ thus stored in 34 at the end of a half-revolution of combustion-expansion (in the example described), are applied to a calculating stage 36, suitable for calculating period $T_4$ (index 4 corresponds to four combustion per cycle) of each half-revolution of the flywheel, in keeping with the equation $$T_4 = \sum_{0}^{21} d_i$$

Last digital value $T_4$ calculated in stage 36 is applied to a buffer memory 38 and it remains there until it is replaced by the next. The average angular velocity of the inertial flywheel of the combustion-expansion phase which was just completed is $\Omega_m = \pi/T_4$.

Values $d_i$ stored in 34 are also applied to another calculating stage 40, suitable for performing, in digital form, a synchronous angular detection of a projection designated $D_4\cos\phi'_4$ of the basic alternating term of $d_i$, added to a phase reference position consisting of first index tooth i=0 or $d_o$ of the series of n/2=22 teeth assigned to a given cylinder. To do this, stage 40 is suitable for calculating:

$$D_4\cos\phi'_4 = (1/11) \cdot \sum_{0}^{21} d_i \cdot \cos(i\pi/11)$$

and for applying it to a buffer memory 42.

The n/2 weighing factors (or 22 in the example described) of the above-mentioned expression consist of the eleven values successively taken twice, but with opposite signs, by term ($\cos i.\pi/11$) when row i of the tooth concerned varies from 0 to 10 then from 11 to 21. These values are stored in permanent memory 41 associated with calculating stage 40. Term 68 being the nominal angular pitch of the teeth of measuring ring gear 12 (in the example described here $\delta\Theta = \pi/22$), instantaneous angular velocity $\Omega_i$ of the flywheel is $\Omega_i = \delta\Theta/d_i$, The value projected on the reference axis of basic alternating component E4 of $\Omega_i$ is:

$$E_4\cos\phi_4 = (1/11) \cdot \Omega_i \cdot \cos(i\pi/11)$$

By replacing $\Omega_i$ by its value $\delta\Theta/d_i$ and by taking into account the fact that $d_i$ varies slightly around its average value $d_m = T_4/22$ in the example, it is shown that:

$$E_r\cos\phi_4 = (\Omega^2_m/\delta\Theta) \cdot D_r\cos\phi'_4 \text{ and that:}$$

$$Cg = -a \cdot \Omega_m \cdot E_4\cos\phi_4 + b \cdot \Omega^2_m$$

If teeth ($\delta\Theta_i$) are not placed evenly on the ring gear, it is shown that there will appear a term proportional to $\Omega_m$ in $E_4\cos_4$ but this term is not troublesome because its influence in Cg will be proportional to $\Omega^2_m$ and can be compensated by modifying the value of coefficient b.

In this way, if two terms $d_i$ and $\Omega_i$ are broken down in Fourier series and if a synchronous detection of a projection of their basic alternating component is made in digital form, $D\cos\phi'$ and $E\cos\phi$, which are two dependent variables, will be obtained. In the example described of a four-cycle and four-cylinder engine, there are two combustion per flywheel revolution and therefore four combustion per operating cycle of the engine, which is recalled by the index 4 used, the alternating component of value $E_4\cos\phi_4$ of $\Omega_i$ is connected to the alternating component of value $D_4\cos\phi'_4$ of $d_8$ by the equation $$E_4\cos\phi_4 = -\Omega_m \cdot (22/\pi) \cdot D_4\cos\phi'_4$$

As the above-mentioned experimental study has shown for the low speeds of the engine, $$Cg = -a \cdot \Omega_m \cdot E'_4 + b \cdot \Omega^2_m = a \cdot \Omega^3_m \cdot (22/\pi) \cdot D'_4 + b \cdot \Omega^2_m \text{ by}$$

assuming $E'_4 = E_4\cos\phi_4$ and $D'_4 = D_4\cos\phi'_4$.

Since $\Omega_m = \pi/T_4$, $$Cg = A \cdot D'_4/T^3_4 + B/T^2_4$$

which is the expression sought with $$T_4 = \sum_0^{21} d_i \text{ and } D'_4 = (1/11) \cdot \sum_0^{21} d_i \cdot \cos(i\pi/11),$$

terms A and B being characteristic constants either in the engine concerned, or in all those of its type.

In practice, these constants A and B are determined by a measurement of the torque of the engine at two particular points or, optionally, by a statistical analysis (method of least error squares) of a large number of measurements made in the laboratory on a reference engine, according to the series of engines for which the torquemeter model according to the invention is intended. According to the above, within the framework of the example described, magnitudes $T_4$ and $D'_4$, respectively produced in calculating stages 36 and 40, are, at the end of each half-revolution of the inertial flywheel of the engine, (synchronized by at least one indexing tooth per engine cycle), applied to a calculating stage 44 which produces Cg from these two input magnitudes $T_4$ and $D'_4$ and constants A and B stored for this purpose, term A being previously corrected before use to be applicable at high speeds of the engine.

Actually, as has been indicated above, the above equation $Cg = A \cdot D'_4/T^3_4$ is valid strictly speaking, only for the low speeds of the engine. For the high speeds, a correction of term A is necessary. To do this, in the case of a ring gear 12 integral with the inertial flywheel, an additional calculating stage 48 is provided which produces a corrected term $Ac = A(1-z)$ with $z = (fi/fr)^2$, from the value of A stored in a permanent memory 46, of value $T_4$ provided by buffer memory 38 ($fi = 1/t_4$ = half-revolution frequency, in the example described) and a term fr (resonance frequency in torsion of the crankshaft/flywheel connection) also stored in memory 46. Corrected term Ac is applied to computer 44 which receives $T_4$ from buffer memory 38, B from permanent memory 50 and $D'_4$ from buffer memory 42 and which calculates the average gas torque on a half-revolution, according to the equation, valid at all speeds of the engine $$Cg = Ac \cdot D'_4/T^3_4 + B/T^2_4$$

To obtain a more precise estimation of Cg, coefficients A and B can be identified by the engine operation zone; they can also be made dependent on engine settings, for example, richness r, rate of recirculation of exhaust gases (RGE).

But another method is to keep A and B constant, which makes it possible to obtain a first rough value of Cg, then either to cause a correction mapping (of additive type) or to apply corrective terms to refine the value of Cg. Some practical correction examples will be described below.

In the case of an engine operating with a lean mixture (fuel/air richness, $r<1$) with r not constant, calculating stage 44 which provides Cg is, if necessary, followed by an additional calculating stage 52 which calculates the corrected value of Cg as a function of this richness r, when $r<1$. In this case, the values of r as a function of the speed of the engine deduced from $T_4$ and from produced torque Cg can be measured by a sensor provided for this purpose or even having been determined in a laboratory and their mapping for each type of engines concerned (diesel, in particular), stored in a permanent memory 54. As a function of values $T_4$ and Cg addressed to memory 54, value r to be considered is entered in calculating stage 52 if $r<1$. The latter first determines a correction factor $Q_1 = [1 + p_1(4-1)]$ with $p_1$, close to $+0.5$, then assigns Cg to it to produce a measurement $(Cg)_4 = Cg \cdot Q_1$, corrected by factor $Q_1 < 1$, as a function of richness r of the mixture when $r<1$.

According to this invention, in addition to this optional stage 52, another additional calculating stage 56 (FIG. 2) is provided to correct term Cg as a function of total rate q of recirculation of exhaust gases (RGE) and of the presence of residual burnt gases (GBR) in the cylinders of the engine. This rate q is always small relative to one and its value will be measured by a special sensor provided for this purpose (not shown), or removed to a permanent memory 58 containing a mapping determined in the laboratory as a function of the input variables concerned and in particular of the speed of the engine deduced from $T_4$ and of calculated value Cg. As a function of values $T_4$ and Cg, addressed to memory 58, value q to be considered is entered in calculating stage 56 which produces a correction factor $Q_2 = (1 - p_2 \cdot q)$ with $p_2$ close to 0.5, then Cg or (Cg)r is assigned for producing a torque $(Cg)_q$ corrected as a function of q or $(Cg)_{r,q}$ corrected as a function of r and of q.

A solution other than that described in the abovementioned copending U.S. patent application is possible for performing the corrections relating to the operation of an engine supplied with excess oxidant (air) and therefore operating with lean gas (r<1).

Actually, for gasoline engines operating with a lean mixture with a richness that is not constant or for diesel engines always operating with excess air, the ratio between Cg, the average gas torque produced by each combustion, and Ca, the gas torque alternating with the frequency of the combustion, is no longer constant. However, the knowledge of the way in which it changes makes it possible to perform the necessary correction (excess air correction or filling correction) to go from the value of Ca, which will actually be measured, to corrected value Cg, which is desired.

First, at full throttle for all engines, the total of the rates (RGE+GBR) is minimal and further in the case of gasoline engines r>1, and for diesel engines r is maximal. Therefore, at full throttle, corrections of richness r of the mixture and of burnt gases (RGE+GBR) are minimal. If they are disregarded, the case Cg/Ca=constant of the copending U.S. patent application is found, and it is possible to write $u.(Ca)_{p.g.}=(Cg)_{p.g.}$ regardless of N, with indexes p.g. shifting "full throttle" and term N being the number of revolutions/minute of the engine. This equation makes it possible, as seen above, to identify terms A and B of the expression defining Cg, i.e., $Cg=Ac.D'_4/T^3_4+B/T^2_4$ (stage 44), by the measurements of two "full throttle" points taken at two different speeds. As to coefficient u, it must be determined from measurements of combustion chamber pressures on an engine of each type: $u=(Cg/Ca)_{p.g.}$, term u is constant in the first order, regardless of N.

At full throttle and with r>1, filling R of the cylinders is proportional to Ca (or Cg) in the first order, which explains (see below) that ratio $u=(Cg/Ca)_{p.g.}$ is approximately constant regardless of N at full throttle. Outside of the case of full throttle, by making the engine operate in partial load at several speeds, it has been found experimentally that $(Cg)_p=Ca-K_R \cdot R$, with $k_R$ being a constant term in the first order and R being the filling of the cylinder in compression phase.

Term R represents the total weight of the gas mixture in the cylinder (fuel, oxidant, residual burnt gases or recycled gases). It can be estimated from a stored mapping and/or of measurements made by suitable sensors already installed on the engine. Term $k_R$ is, at all speeds N and with all loads, a constant in the first order that can be identified, in particular at full throttle (p.g.), by the equation:

$$k_R = (1-u).(Ca)_{p.g.}/R_{p.g.}$$

As to the calculation of Ca, it remains unchanged in partial load:

$$Ca = Cg/u = \frac{1}{u} \cdot (Ac \cdot D'_k/T_k^3 + B/T_k^2)$$

Figure 3:
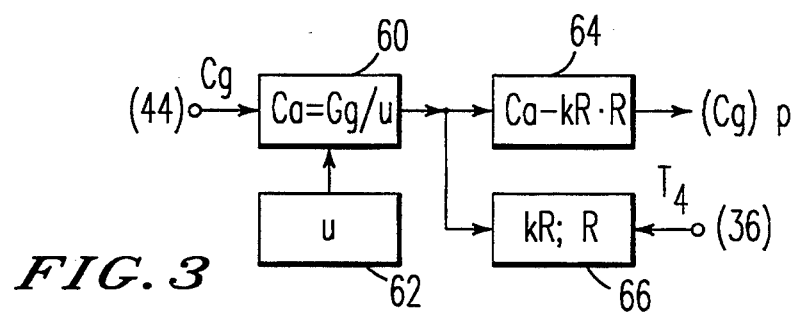

FIG. 3 is a functional diagram of the additional circuits of a measuring device of the average gas torque per combustion, providing the filling correction in case of operation with a lean mixture with a richness that is not constant.

Figure 2:
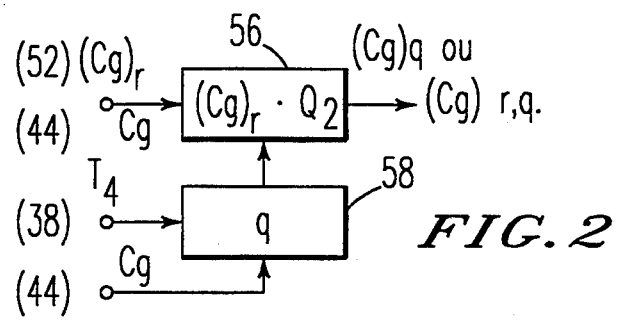
FIGS. 2, 3 and 4 are diagrams of stages of corrections according to the invention.

According to FIG. 3, circuits 52 to 58 of FIGS. 1 and 2 are replaced by circuits 60 to 66. Calculating circuit 60 receives from stage 44 an uncorrected signal Cg: $Cg=A.D'_k/T^3_k+B/T^2_k$ and from a memory 62, coefficient u. Circuit 60 calculates an intermediate term $Ca=Cg/u$ and the result is applied to another calculating stage 64. A memory 66 contains above-mentioned term $k_R$ and, further, the mapping of fillings R, expressed from available magnitudes, calculated or measured by suitable sensors. Memory 66 applies values $k_R$ and R to calculating circuit 64 which produces a measuring signal of the average gas torque per combustion of an engine operating with a lean mixture:

$$(Cg)_p = Ca - k_R \cdot R = \frac{1}{u} \cdot (Ac \cdot D'_k/T_k^3 + B/T_k^2) - k_R \cdot R$$

In the case of a diesel engine, the filling is constant in the first order and the expression of Cg as a function of Ca brought back to $(Cg)_D=Ca-K_R$, term $K_R$ being a constant in the first order but, for more precision, $K_R$ can be mapped. In this way, for a diesel engine, the average gas torque per combustion is:

$$(Cg)_D = \frac{1}{u} \cdot (Ac \cdot D'_k/T_k^3 + B/T_k^2) - K_R.$$

Figure 4:
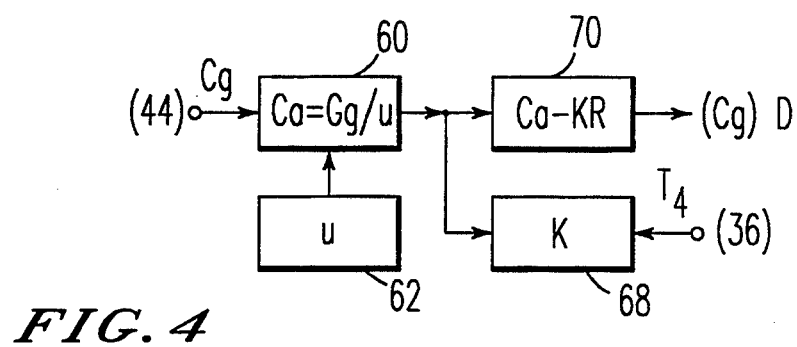

FIG. 4 represents the diagram of modifications which are derived from the above. According to FIG. 4, circuits 64–66 of FIG. 3 are replaced by circuits 68–70. Circuit 68 is a memory which contains constant $K_R$ or its mapping and circuit 70 has a calculating stage which produces measuring signal $(Cg)_D=Ca-K_R$, applicable to diesel engines.

The various calculating stages mentioned above, as their intervention in the process is described, consist of a microprocessor operating under the control of an application software L developed for this purpose and contained in permanent memory 50. Another manner of doing this, of course, is to produce at least one part of the provided operations by an analog computer whose various stages each provide a particular function.

All the represented circuits can be produced in the form of integrated circuits or hybrid circuits, specific to the problem to be solved.

In the example described above, the engine concerned is a four-cycle and four-cylinder gasoline engine and the number of real or virtual reference points of measuring ring gear is 44. The invention, of course, is not limited to this particular example. It actually relates to all internal combustion heat engines regardless of type: four-cycle, two-cycle, gasoline, diesel or any other fuel and regardless of the number of cylinders or the number of reference points of the measuring ring gear.

If the number of periods per operating cycle of the engine is designated by t, the number of its cylinders by k and the number of real or virtual reference points of the measuring ring gear by n, the number of reference points which corresponds to each of the angular periods $(\pi t/k)$ of the combustion in the engine and which will be taken into account for the synchronous angular detection of the instantaneous angular speed at the frequency of the combustion is $n_c=n.t/(2.k)$, which provides data combustion by combustion and therefore cylinder by cylinder:

$$T_k = \sum_{o}^{(n_c-1)} d_i.$$

Under these conditions, the term:

$$D_4 \cos\phi'_4 = (1/11) \cdot \sum_{o}^{21} d_i \cdot \cos(i \cdot \pi/11) = D'_4$$

mentioned above is written in the generalized form:

$$D_k \cos\phi'_k = (2/n_c) \cdot \sum_{o}^{(n_c-1)} d_i \cdot \cos(1 \cdot 2\pi/n_c) = D'_4$$

The invention has been described in relation to a particular embodiment which relies on intermediate variables $d_1$, $T_4$ and $D'_4$ and in which the calculations of $d$, $T_4$ and $D'_4$ were performed digitally but the calculation of Cg and its corrections can be performed by standard analog circuits Thus, primary signal 24, whose frequency is modulated by speed variations $\Omega$, contains vector E with frequency $f_i$. To extract vector E and more precisely its projection $E\cos\phi$, it is necessary to use a frequency-voltage converter followed by an angular synchronous detector at frequency $f_i$ with a suitable phase, then to calculate:

$$Cg = -a.\Omega_m.E\cos\phi + b.\Omega^2_m$$

The invention has been described with reference to correcting devices but it also relates to processes for correcting value Cg as a function of certain operating characteristics of the engine The operations of these processes are derived in an obvious manner from the description of the correcting devices made in connection with FIGS. 2, 3 and 4 and will therefore not be described separately.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. System for measuring digital value Cg, representative of an average gas torque per combustion of a gas mixture in k cylinders of an internal combustion engine having t periods per operating cycle, said system comprising:

a number n of measuring reference points integrally rotating with one of an inertial flywheel and an crankshaft of the engine;

means for defining at least one indexing reference of the reference points;

a stationary advancement sensor for the reference points, mounted in the vicinity of the reference points; first calculating means for producing a primary digital value $d_i$, representative of an instantaneous advancement period in front of sensor, of each of the reference points;

second calculating means for producing from the primary digital value $d_i$ a first secondary digital value $T_k$ representative of a total period of advancement in front of the sensor of each series of $n_c$ reference points, relating to the angular period of a combustion in the engine, wherein $n_c = (n \cdot t/2 \cdot k)$ and $T_k = \sum_{o}^{(n_c-1)} d_i$;

third calculating means for producing, from the primary digital value d, and weighing factor $\cos(i.2\pi/n_c)$ stored in a permanent memory, a second secondary digital value $D_k\cos\phi'_i$ representative of a projection, on a phase reference line of the reference points corresponding to an original of the angular periods of the combustion, of the amplitude of an alternating component of the instantaneous periods $d_i$ of advancement of the measuring reference points in front of the sensor, at the frequency of the combustion in the engine, with $$D_k\cos\phi'_k = (2/n_c) \cdot \sum_{o}^{(n_c-1)} d_i \cdot \cos(i \cdot 2\pi/n_c);$$

fourth calculating means for producing desired digital value Cg, defined by the equation $$Cg = A.(D_k\cos\phi'_k)/T^3_k + B/T^2_k = A.D'_k/T^3_k + B/T^2_k$$

from two secondary digital values $D_k\cos\phi'_k$ and $T_k$ and two constants A and B experimentally determined and stored in permanent memories;

a device for correcting digital value Cg as a function of a total rate q of recirculation of exhaust gases (RGE) and residual burnt gases (GBR), said correcting device comprising fifth calculating means for producing a correction factor $Q_2 = (1 - p_1.q)$, in which $p_2$ is an experimentally determined constant close to 0.50 and q is a value of said total rate, and for applying $Q_2$ to value Cg, corrected as a function of richness r of the gas mixture, for providing a corrected digital value $(Cg)_q$ or $(Cg)_{r,q}$.

2. System according to claim 1, wherein values of total rate q relating to a given type of engine are stored in a permanent memory associated with said fifth calculating means.

3. System according to claim 1, including a device for correcting digital value Cg, wherein the engine operates with excess oxidant, so as to obtain a corrected value $(Cg)_p$, said correcting device comprising:

calculating means for producing an intermediate value $Ca = Cg/u$, wherein u is a stored constant less than one and is determined experimentally;

calculating means for producing the desired value $(Cg)_p = Ca - k_R.R$, wherein $k_R$ is a stored constant determined experimentally and R is the filling of the cylinders, determined experimentally as a function of magnitudes already calculated or measured, and forming a stored mapping.

4. System according to claim 1 including a device for correcting digital value Cg, wherein the engine is a diesel engine, for obtaining a corrected value $(Cg)_D$, said correcting device comprising:

calculating means for producing an intermediate value $Ca = Cg/u$, wherein u is a stored constant less than one and is determined experimentally;

calculating means for producing the desired value $(Cg)_D = Ca - K_R$, wherein $K_R$ is a value determined experimentally and stored as a function of magnitudes already calculated or measured.

5. Process for correcting digital value Cg, representative of an average gas torque per combustion of a gas mixture is an internal combustion engine, as a function of total rate q of recirculation of exhaust gases and residual burnt gases in cylinders of the engine, comprising the steps of:

produce a correction factor $Q_2 = (1 - p_2 \cdot q)$, in which $p_2$ is a constant close to 0.50 to be determined experimentally and q is the value of said total rate, then applying factor $Q_2$ to measuring value Cg, previously corrected as a function of richness r of the gas mixture when $r < 1$, for providing a corrected digital value $(Cg)_q$ or $(Cg)_{r,q}$.

6. Process according to claim 5, wherein the values of total rate q for a given type of engine are a function of torque (Cg) produced and the speed of the engine.

7. Process for correcting a digital value Cg, representative of an average gas torque per combustion of a gas mixture in an internal combustion engine, including the following steps for producing a value for measuring an average gas torque per combustion $(Cg)_p$ relating to an engine operating with excess oxidant:

calculating an intermediate value $Ca = Cg/u$, wherein $u < 1$, and is a stored constant determined experimentally, and calculating a desired value $(Cg)_p = Ca - k_R \cdot R$, wherein $k_R$ is a stored constant determined experimentally and R is the filling of the cylinders, determined experimentally and forming a stored mapping.

8. Process for correcting a digital value Cg, representative of an average gas torque per combustion of a gas mixture in an internal combustion engine, wherein, for producing a value for measuring the average gas torque per combustion of a diesel engine, $(Cg)_D$, it further comprises the steps of:

calculating an intermediate value $a = Cg/u$, wherein $u < 1$, and is a stored constant, determined experimentally; and calculating a desired value $(Cg)_D = Ca - K_R$, wherein $K_R$ is a value determined experimentally and stored as a function of magnitudes already calculated or measured.

* * * * *